US006222675B1

(12) United States Patent
Mall et al.

(10) Patent No.: US 6,222,675 B1
(45) Date of Patent: Apr. 24, 2001

(54) AREA OF INTEREST HEAD-MOUNTED DISPLAY USING LOW RESOLUTION, WIDE ANGLE; HIGH RESOLUTION, NARROW ANGLE; AND SEE-THROUGH VIEWS

(75) Inventors: Benedict J. Mall, San Marcos, CA (US); Jean-Jacques Fontaine, Eraghy/oise (FR)

(73) Assignee: Kaiser Electro-Optics, Inc., Carlsbad, CA (US)

( * ) Notice: Subject to any disclaimer, the term of this patent is extended or adjusted under 35 U.S.C. 154(b) by 0 days.

(21) Appl. No.: 09/203,293

(22) Filed: Dec. 1, 1998

(51) Int. Cl.$^7$ .............................. G02B 27/14; G09G 5/00
(52) U.S. Cl. .............................. 359/630; 359/629; 345/7; 345/8; 345/9
(58) Field of Search ..................... 359/630–633, 359/738–739, 478, 629; 345/7–9, 32

(56) References Cited

U.S. PATENT DOCUMENTS

| 1,290,777 | 1/1919 | O'Brien ................................ 359/420 |
| 2,388,673 | 11/1945 | Brown .................................. 359/420 |
| 2,433,338 | 12/1947 | Brown .................................. 359/420 |
| 2,512,153 | 6/1950 | Henyey, et al. ....................... 359/420 |
| 2,527,719 | 10/1950 | Greenstein, et al. ................. 359/420 |
| 4,037,921 | 7/1977 | Cox ..................................... 359/420 |
| 5,299,063 | 3/1994 | Fritz, et al. ........................... 359/631 |
| 5,487,665 | 1/1996 | Lechner et al. ....................... 434/44 |
| 5,572,229 | 11/1996 | Fisher ................................... 345/8 |
| 5,579,165 | 11/1996 | Michel, et al. ....................... 359/630 |
| 5,629,807 | 5/1997 | Hall ..................................... 359/630 |
| 5,644,323 | 7/1997 | Hildebrand ............................ 345/8 |
| 5,646,783 | 7/1997 | Banbury ............................... 359/630 |
| 5,726,670 | 3/1998 | Tabata et al. .......................... 345/7 |
| 5,808,589 | 9/1999 | Fergason .............................. 345/8 |

OTHER PUBLICATIONS

Kooi, F.L., "Binocular Configurations of a Night–Flight Head–Mounted Display,"Displays, Vol. 14, No. 1, 1993, pp. 11–20.

Primary Examiner—Georgia Epps
Assistant Examiner—David N. Spector
(74) Attorney, Agent, or Firm—Charles J. Kulas; Townsend and Townsend and Crew, LLP

(57) ABSTRACT

Different viewing mechanisms are used for left and right eyes. One of the eyes is presented with an image from a single image source that occupies the entire field of view of the eye. The view presented by this first image source is a wide field of view with a relatively low resolution. A second image source presents a second view to the other eye of the user. The second view is a narrower-field-of-view, higher resolution depiction of the same view or scene as presented by the first image source. Additionally, the second image source includes a direct see-through path so that the user can view the real outside surroundings. The combination of low resolution, wide field of view in one eye combined with a high resolution, narrow field of view with see-through in the other eye allows the user to be presented with a computer-generated simulation view having both wide field of view with specific, high resolution at the viewer's visual center of interest. Additionally, since a partial view of the real outside surroundings is presented to one of the user's eyes, the user also has access to real-world information.

9 Claims, 4 Drawing Sheets

AREA OF INTEREST HEAD-MOUNTED DISPLAY USING LOW RESOLUTION, WIDE ANGLE; HIGH RESOLUTION, NARROW ANGLE; AND SEE-THROUGH VIEWS

CROSS REFERENCE TO RELATED APPLICATION

This invention is related to co-pending patent application Ser. No. 09/203,292 filed Dec. 1, 1998, entitled "SMOOTH TRANSITION DEVICE FOR AREA-OF-INTEREST HEAD MOUNTED DISPLAY" hereby incorporated by reference.

BACKGROUND OF THE INVENTION

This invention relates in general to display systems and more specifically to binocular systems presenting different views from electronic image sources.

Head-mounted displays (HMDs) are useful for immersing a viewer in an artificial, or enhanced, visual world. Uses for HMDs include simulation systems, virtual reality applications, night vision, infravision, instrumentation displays and video games. In a binocular HMD separate views are presented to each of the user's left and right eyes. The use of separate views for each eye gives greater realism as the user is able to perceive stereo, or depth, effects.

It is common for the views to be generated by a computer using a digital imaging device such as a liquid crystal display. In such a system, each of the user's eyes is presented with a view from a separate image source. The presentation from the image source can be direct, reflected, partially reflected, or a combination of these. For example, where it is desired that the image source projection fill up the entire angle of view of an eye, the image source may be placed directly in front of the eye with interceding collimating lenses for proper focusing. A viewfinder, sightguide or other enclosure or housing is provided so that the user's field of view is restricted to viewing the image source alone. This can be done for both eyes.

Another possibility is to have an indirect view of the image source. This can be accomplished by using a half-silvered mirror which allows the image source to be placed at an off-angle from the user's line of sight. The user looks through the half-silvered mirror and is able to see through the mirror to a scene other than the scene presented by the image source. Meanwhile, the image source's projection is transferred via the mirror and, possibly, other optical devices, to the user's eyes so that the user sees the indirect image source projection superimposed on the other scene. For example, the view over which the image source projection is superimposed can be of the outside world, another image source-generated scene or scenes or information presented by other means.

However, a problem exists in that the trade-off between presenting an exclusive image to view to the user's eyes fully immerses the viewer in a simulated world, but prevents the user from seeing the real world. On the other hand, by using superimposed presentations, the degree of control over what the user sees is reduced. The superimposed images may overlap and conflict with each other. Also, it is difficult to build a device that provides a superimposed view to a user where the view or scene generated by the image source completely covers the user's field of view.

Although it is difficult to build large field of view devices that superimpose images, there are cases where such a superimposed image view is desirable. An example of this is in an aircraft simulator, or trainer, where the pilot needs to be presented with simulated views outside the cockpit while at the same interacting with a real-world physical instrument panel, controls and cockpit surrounding the pilot. Thus, it is desirable to create a head-mounted display that superimposes imaged views and alternative views, such as a direct view of an instrument panel, while minimizing the problems and shortcomings of such an approach.

SUMMARY OF THE INVENTION

The invention uses different viewing mechanisms for each eye. One of the eyes is presented with an image from a single image source that occupies the entire field of view of the eye. The view presented by this first image source is a wide field of view with a relatively low resolution. A second image source presents a second view to the other eye of the user. The second view is a narrower field of view, higher resolution depiction of the same view or scene as presented by the first image source. Additionally, the second image source includes a direct see-through path so that the user can view the real outside surroundings. The combination of low resolution, wide field of view in one eye combined with a high resolution, narrow field of view with see-through in the other eye allows the user to be presented with a computer-generated simulation view having both wide field of view with specific, high resolution at the viewer's visual center of interest. Additionally, since a partial view of the real outside surroundings is presented to one of the user's eyes, the user also has access to real-world information.

The user perceives a single scene with all of the elements from the different views composited into a single perception. Thus, the user perceives an imaged wide field of view at low resolution with an imaged center area of interest at high resolution along with a real-world view. In the flight simulator application, the instrument panel, cockpit and other objects that are not "out-the-window" views are programmed into the computer graphics system so that they are "clipped" against the computer generated imaged scenes. This eliminates overlap of the computer generated views with the real-world cockpit view.

One embodiment of the invention is a viewing apparatus allowing a user to view a scene. The viewing apparatus includes: a first viewer including a first image source presenting a first-resolution, first-angle view of the scene to a first eye of the user; a second viewer including a second image source presenting a higher resolution, narrower angle view of the scene to a second eye of the user; and a see-through pathway in the second viewer so that the second eye of the user is simultaneously presented with a non-imaged view along with the view presented by the second image source.

DESCRIPTION OF THE SPECIFIC EMBODIMENTS

Figure 1:
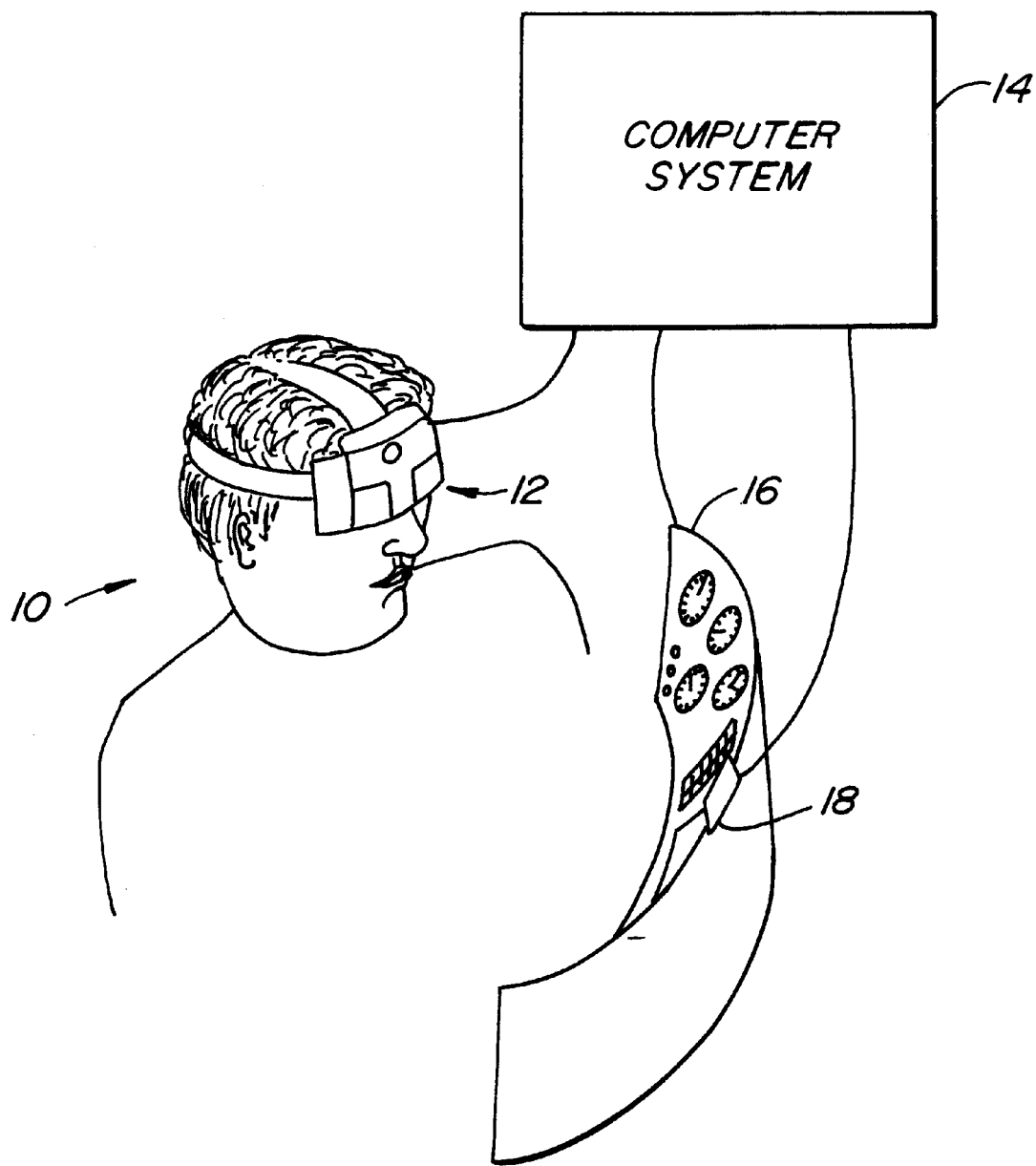
FIG. 1 illustrates the present invention used in a simulation system.

FIG. 1 shows an example of the present invention applied to a simulation system.

In FIG. 1, user 10 is participating in a flight simulator. Head Mounted Display (HMD) 12 is secured to the user's head and includes left and right viewers through which the user is presented scenes from computer image sources (not shown) incorporated into the HMD. Computer system 14 controls the image sources within HMD 12 and also controls the simulator's instrument panel 16 and other cockpit controls (not shown). Additionally, computer system 14 is connected to HMD position tracker 18 for the purpose of precisely determining the position and orientation of the HMD, and the user's line-of-sight, in space.

As is known in the art, computer system 14 computes a simulation view of any desired scene based on the user's head position. In this manner, users may move their heads about freely and their perceptions of the simulated scene will change in accordance with the head movements. This allows computer system 14 to generate a 360° field of view of a simulated environment. In the case of a flight simulation, user 10 manipulates instruments and controls. The resulting change in behavior of the simulated aircraft is calculated by the computer system and the appropriate simulated view is generated. Naturally, many frames per second are generated and the scenes are computed in real time and presented to the user to simulate actual behavior and flight characteristics of the aircraft used in the simulation.

Figure 2:
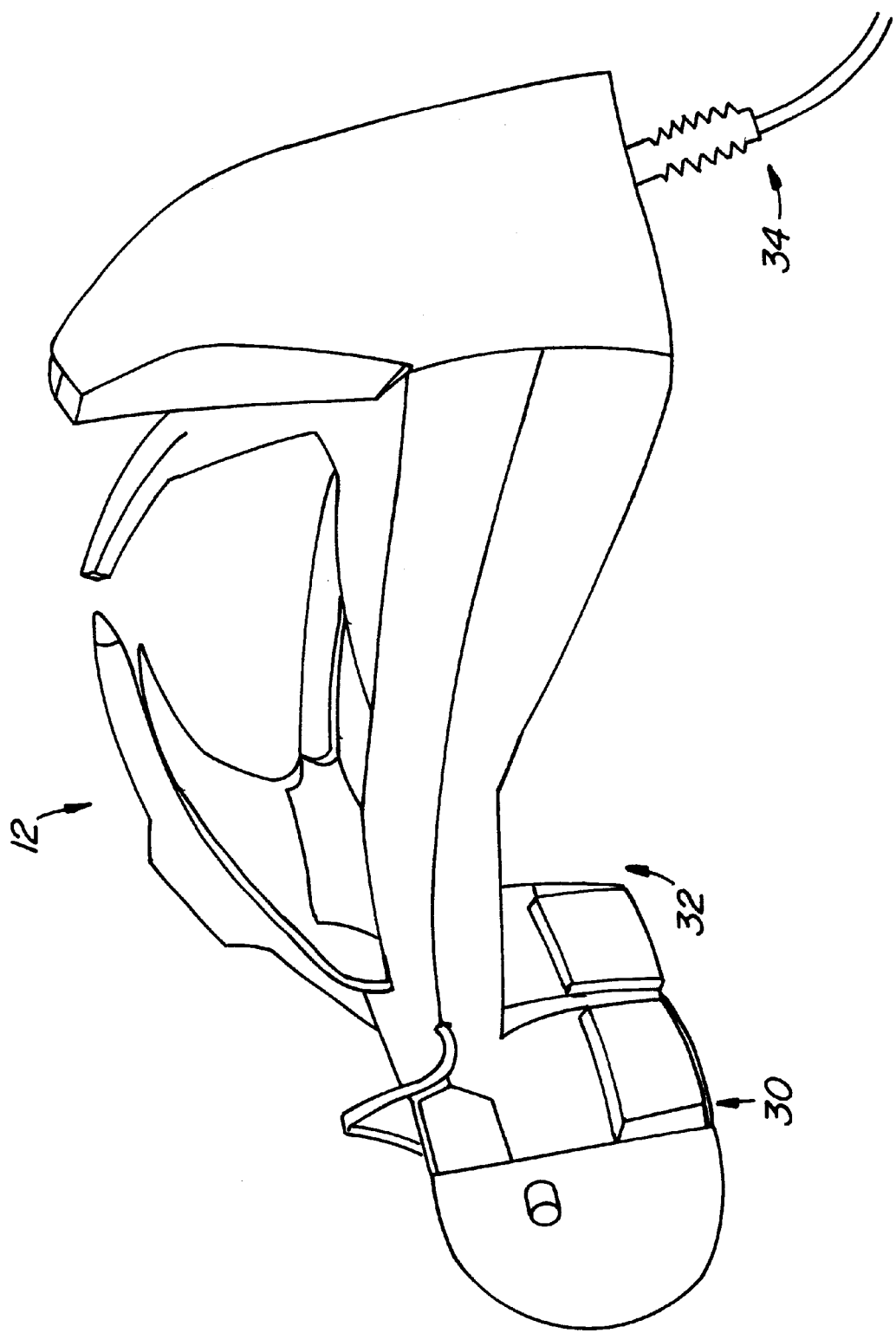
FIG. 2 shows a perspective view of a head-mounted display unit.

FIG. 2 shows an illustration of the head-mounted display 12 of FIG. 1.

FIG. 2 is an exterior depiction of a preferred embodiment of the invention incorporated into an HMD product called the "Monocular See-Through HiDef™ HMD System" or "MOST HiDef™ HMD." This product will be manufactured by Kaiser Electro-Optics, Inc. However, this design is but one of many that will be suitable to practice the invention.

FIG. 2 shows left eyepiece 30 and right eyepiece 32 as somewhat separate components of the HMD. As discussed below, these components are substantially operationally separate, also. Left and right eyepieces, or viewers, of HMD 12 operate optically independently of each other. Software in computer system 14 takes into account the interrelationship between the two imaged views presented to the user. Imaging information is transmitted along cable 34. This can be a video signal, digital signal from a computer, etc. The signal is used to generate views on image sources for the left and right viewers.

Figure 3:
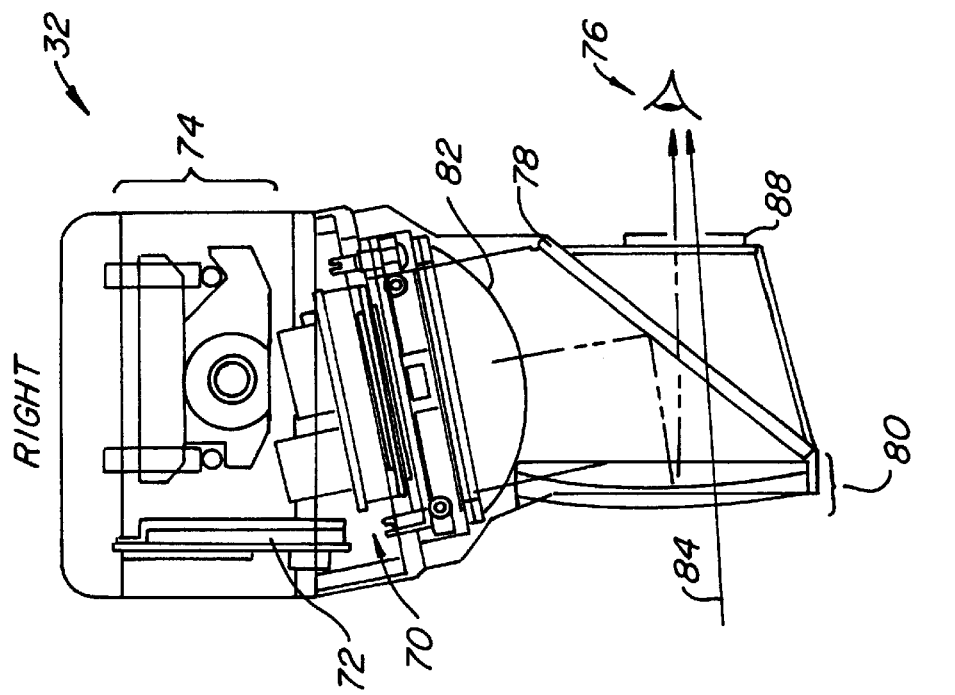
FIG. 3 shows the left side and right side viewers of the present invention.
Figure 3:
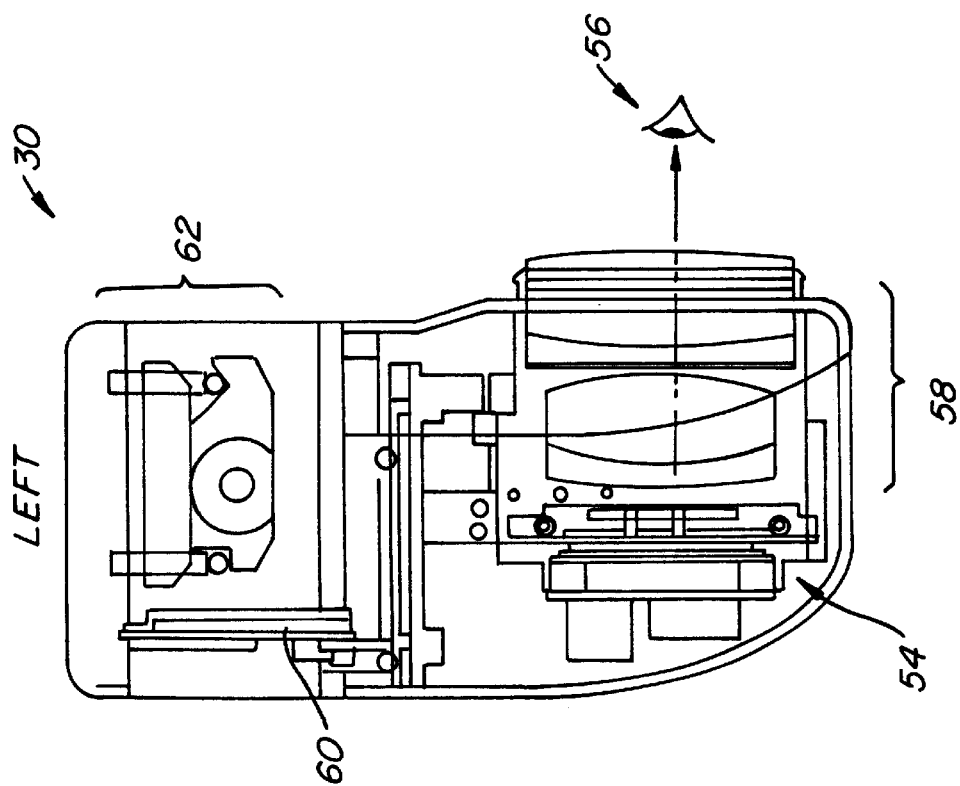

FIG. 3 shows cutaway mechanical views for the left and right viewers. Left viewer 30 provides an 80°0 diagonal, full-field-of-view imaged view to the user's left eye. This corresponds to viewer 30 of FIG. 2. Right viewer 32 presents a 40° diagonal imaged view to the user's right eye. This corresponds to viewer 32 of FIG. 2.

Left viewer 30 has image source 54 located in front of, and in-line with, the user's left eye 56. Collimating lenses at 58 focus the projected imaged scene at infinity. In the preferred embodiment, lenses similar to those disclosed in the Visual Immersion Module (VIM®) lens design of U.S. Pat. No. 4,859,031 are used. For the wide-field, non-see through module, however, any suitable optical arrangement can be used. Image source 54 is a liquid crystal display (LCD) device with a power supply and backlight source to provide a projected image. The signal interface to image source 54 is at 60. Image signal information received from cable 34 of FIG. 2 is coupled to the interface 60. The Inter-pupillary Distance (IPD) adjusting mechanism at 62 allows for changing the optics for different users' visions.

Referring to right viewer 32, similar components are used, although in a different arrangement. Image source 70 is an LCD image source identical with image source 54. Image source 70 is coupled to the image signal source via interface board 72, which is identical to interface board 60. An IPD adjusting mechanism at 74 serves to adjust for the user's specific right eye vision.

Notably, image source 70 is not directly in front of the user's right eye 76. Instead, image source 70 is offset from the user's direct line of vision. The projected image from image source 70 is focused through lens 82. A portion of the projected image from image source 70 is reflected from beam-splitter 78 toward dual-reflector/combiner 80. Dual reflector/combiner 80 reflects the projected image back towards beam-splitter 78 where a portion of the incident light passes through beam-splitter 78 to impinge on the user's right eye 76.

By proper choice and coordination of image source 70 and lens 82, the projected image produced is a 40° diagonal field of view at the same resolution of image source 54 which produced an 80° diagonal field of view. Thus, projected image from image source 70 through lens 82 is a narrower field of view but at a higher resolution of four times the pixels per area. This higher resolution, narrower field of view image occupies only a portion of the user's overall field of view through right viewer 32. In the preferred embodiment, the higher resolution, narrower field of view projected image is centered within the user's right-eye field of view.

Right viewer 32 also presents a view of the outside world via the see-through path illustrated by line 84. Light from the outside environment passes through dual reflector/combiner 80 and through beam splitter 78 to impinge on the user's right eye 76. The effect that the user perceives is that of a superimposition of the projected image from image source 70 and light from the outside environment.

Figure 4A:
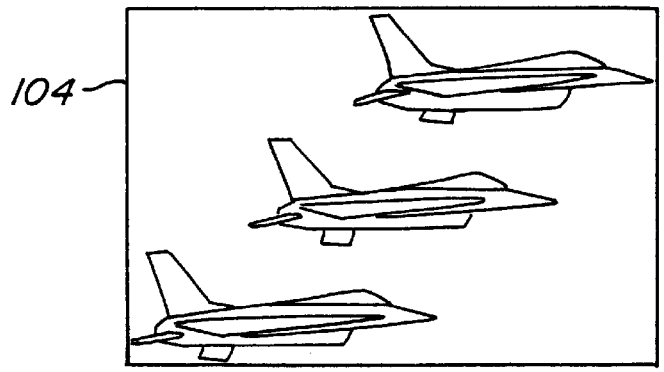
FIG. 4A shows the view through the low-resolution wide angle viewer.
Figure 4B:
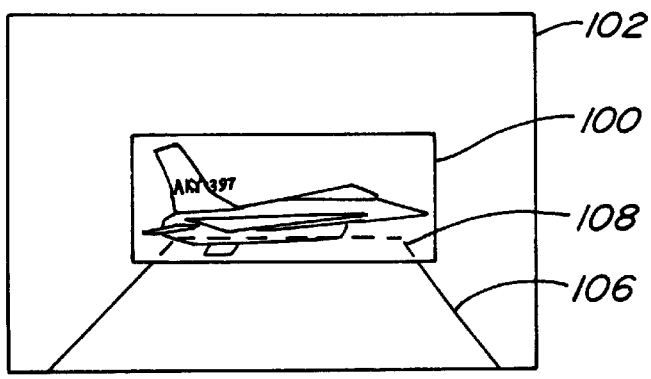
FIG. 4B shows the view through the right side, high resolution, narrow view viewfinder.
Figure 4C:
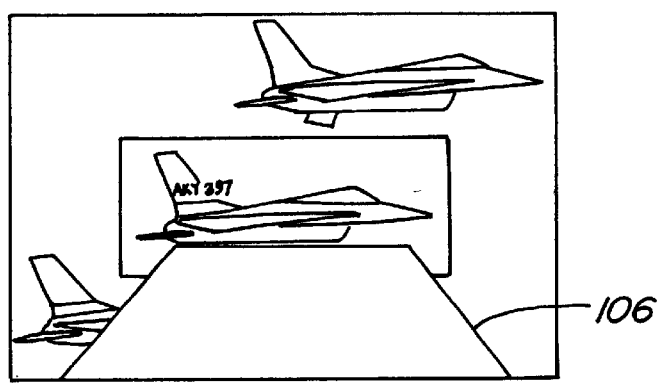
FIG. 4C shows a user's perceived view of the composite scene of the left and right viewers.

FIGS. 4A–C illustrate scenes, or views, through the left and right viewers and show the perceived combination of views resulting from the presentation of images and the user's physiology.

FIG. 4A shows an example view through the left viewer. In the application of an aircraft simulator, a typical scene would include other aircraft, as shown in FIG. 4A. Since this is the left-eye view, the image of FIG. 4A is an 80° field of view at a relatively lower resolution. Also, the image in the left viewer shown in FIG. 4A is a fully-imaged view; that is, it results solely from computer-generated data.

FIG. 4B shows the view through the right-eye viewer. In FIG. 4B, window 100 represents the 40° field of view at relatively high resolution. Note that window 100 is centered within the overall field of view represented by window 102. The field of view of window 100 is matched to the left-eye viewer field of view window 104. That is, window 100 is a higher resolution image of a portion of window 104. The image in window 100 may also be adjusted to provide depth cues, for example, as in stereo images. Also visible within the right eye field of view window 102 are any objects from the real-world environment surrounding the user such as a mock-up instrument console 106. Note that console 106 is shown extending into the imaged view of window 100. This overlap, or superimposition, of the two images is shown by a dotted line 108 illustrating the outline of instrument console 106.

Because of well-known physical and psychological viewing properties of humans, the result of presenting the images of FIGS. 4A and 4B to a user's left and right eyes, respectively, is shown in FIG. 4C. That is, the views of the left and right eyes are combined so that an overall image of a wide-angle low resolution view; plus a narrower angle, higher resolution view along with a view of the outside environment results in a perceived single scene. This gives the advantage of showing the user's center of interest in high resolution while providing a wider, lower resolution, overall field of view. Note that the user is also able to view non-simulated objects such as the instrument console 106. A refinement to the presentation is that both the low resolution and the high resolution images are "clipped" to a predetermined mask of the instrument console. Such clipping is accurately done in real time using the updated position of the head-mounted display. In other words, as the user's head moves, the computer determines the new position of the instrument console and masks off any portions of the low resolution or high resolution images that would overlap with the console, thus providing the user with an unobstructed view of the console.

Thus, an improved viewing system has been disclosed. Although the system has been described with respect to a specific embodiment, it should be apparent that many variations from the specific embodiment are possible while remaining within the scope of the invention. For example, the image sources may be of many types, such as video, fiber optic, plasma, micromirror, etc. Although an external computer system is used, the invention may be achieved with embedded processing or without the aid of a computer. For example, predefined digital images, or text and numeric information, can be stored within a portable head-mounted display. These images can later be presented to the left and right eyes in accordance with the discussion above. Another application for the invention is for vision enhancement as in night sight or infrared viewing devices. In these cases, the imaged views can be generated by image intensifiers, low light television cameras or infrared sensors.

The image source modules may also be used to display symbology, such as the symbology displayed ona pilot's aircraft head-up display. The adaptation of the invention to these applications should be readily understood by one of skill the art. Different apparatus or methods can be employed to perform various functions discussed herein. For example, the function performed by tracker 18 can be achieved by optical, mechanical, inertial, electromagnetic, ultrasonic, etc., designs. Analysis software can be used to communicate theorientation of the user's head to either the computer image generator, camera or sensor. The invention can be adapted for use in a virtual retinal display approach. The field-of-view can be increased by using multiple image sources arranged in a tiling, partial overlap scheme. Many substitutions, arrangements, or replacements of components are possible which will provide a system that can adequately implement the invention. Thus, the scope of the invention is to be determined solely by the appended claims.

What is claimed is:

1. A viewing apparatus allowing a user to view a scene, the viewing apparatus comprising:

a first viewer including a first image source presenting a first-resolution, first angle view of the scene to a first eye of the user;

a second viewer including a second image source presenting a higher resolution, narrower angle view of the scene to a second eye of the user; and a see-through pathway in the second viewer so that the second eye of the user is simultaneously presented with a non-imaged view along with the view presented by the second image source.

2. The viewing apparatus of claim 1, wherein the see-through pathway comprises a direct view of the user's surroundings.

3. The viewing apparatus of claim 2, wherein projected light is emitted by the second image source in a linear direction to create a projected view of the scene, the second viewer further comprising:

a dual reflecting/combining lens;

a beamsplitter;

a sight guide for securing the beamsplitter and dual reflecting/combining lens in position, and for orienting the second eye of the user so that light from the user's surroundings passes through the dual reflecting/combining lens and the beamsplitter to impinge on the second eye, wherein the projected light emitted by the second image source reflects from the beamsplitter to the dual reflecting/combining lens which reflects the projected light back through the beamsplitter to impinge on the second eye thus presenting the second eye with simultaneous imaged and non-imaged views.

4. The viewing apparatus of claim 3, further comprising:

a head mounted display for securing the first and second viewers to the user's head.

5. The viewing apparatus of claim 4, further comprising:

a digital image interface coupled to the first and second image sources for accepting signals representing predetermined scenes for presentation to the user's eyes through the image sources.

6. The viewing apparatus of claim 5, further comprising a computer coupled to the digital image interface, wherein the computer is used to generate images of the scene for display by the image sources;

a position tracking mechanism fixedly coupled to the head mounted display for tracking the position of the head mounted display and for providing position information to the computer; and software executing on the computer for generating scene images for display on the image sources in response to the position information.

7. The viewing apparatus of claim 5, further comprising:

multiple image sources arranged in a tiled manner in one or more of the viewers.

8. The viewing apparatus of claim 5, wherein at least one of the viewers includes a retinal display device.

9. A head mounted display system comprising:

a first viewer including a first image source presenting a first-resolution, first angle imaged view of the scene to a first eye of the user;

a second viewer including a second image source presenting a higher resolution, narrower angle imaged view of the scene to a second eye of the user; and a see-through pathway in the second viewer so that the second eye of the user is simultaneously presented with a direct view of the user's surroundings along with the imaged view presented by the second image source.

\* \* \* \* \*